(12) United States Patent
Betts-Lacroix et al.

(10) Patent No.: US 9,485,966 B1
(45) Date of Patent: Nov. 8, 2016

(54) DEVICE AND METHOD OF ANIMAL REWARD

(71) Applicant: Mousera, Inc, San Mateo, CA (US)

(72) Inventors: Jonathan Betts-Lacroix, Belmont, CA (US); Timothy L. Robertson, Belmont, CA (US); Laura R. Schaevitz, Los Gatos, CA (US)

(73) Assignee: Vium, Inc, San Mateo, CA (US)

( * ) Notice: Subject to any disclaimer, the term of this patent is extended or adjusted under 35 U.S.C. 154(b) by 91 days.

(21) Appl. No.: 14/675,717

(22) Filed: Mar. 31, 2015

(51) Int. Cl.
| | |
|---|---|
| *A01K 29/00* | (2006.01) |
| *A01K 1/03* | (2006.01) |
| *A01K 15/02* | (2006.01) |
| *H05B 3/00* | (2006.01) |
| *G05D 23/19* | (2006.01) |
| *H05B 33/08* | (2006.01) |

(52) U.S. Cl.
CPC ............ *A01K 29/005* (2013.01); *A01K 1/031* (2013.01); *A01K 15/02* (2013.01); *G05D 23/1917* (2013.01); *H05B 3/0033* (2013.01); *H05B 33/0854* (2013.01)

(58) Field of Classification Search
CPC ............................ A01K 29/005; A01K 1/031
USPC .................................................. 119/421, 712
See application file for complete search history.

(56) References Cited

U.S. PATENT DOCUMENTS

| | | | |
|---|---|---|---|
| 2006/0112898 A1* | 6/2006 | Fjelstad ............... | A01K 1/0236 119/496 |
| 2006/0201437 A1* | 9/2006 | Ryan .................... | A01K 1/0107 119/165 |
| 2015/0223433 A1* | 8/2015 | Navawongse ....... | A01K 29/005 119/421 |

OTHER PUBLICATIONS

Christopher J. Gordon; Temperature Regulation in Laboratory Rodents; 1993, Cambridge University Press; New York.
Institute for Laboratory Animal Research, National Research Council; 2011; The National Academies Press; Washington, D.C.

* cited by examiner

*Primary Examiner* — Monica Williams
(74) *Attorney, Agent, or Firm* — Kim Rubin Patent Agent

(57) ABSTRACT

The invention describes an automated method, device and system for both husbandry and study purposes of animals by providing a heat reward for specific behavior. Embodiments include maintaining the cage temperature at a normal, comfortable temperature for the animals, such as mice, using radiant heat rather than conducted heat to provide the reward, using home cages for the animals, detecting the behavior fully automated, operating in animal darkness, and using cages that are free of electrical penetrations. Some embodiments have one animal in a cage. Some embodiments have or support multiple animals in a cage and include methods to detect automatically identify animals, locate animals in the cage and associate a behavior and reward for a specific animal. Some embodiments place all sensors and radiant heat sources outside the cage, or use infrared sources for both heating and for IR camera lighting.

20 Claims, 3 Drawing Sheets

DEVICE AND METHOD OF ANIMAL REWARD

Substitute Specification, clean version, per 37 CFR 1.52, 1.121(b)(3), 1.125; 37 CFR 1.74, 1.77(b)(9).
No new matter has been added.

FIELD OF THE INVENTION

The invention relates to management of animals in a vivarium for both husbandry and study purposes. More specifically it relates to rewarding a desired animal behavior with warmth.

BACKGROUND

Vivariums house a number of animals, typically test animals, such as mice, in a number of cages, often a large number. The test animals are frequently used to test drugs, genetics, animal strains, husbandry experiments, methods of treatment, procedures, diagnostics, and the like. We refer to all such uses of a vivarium as a study.

Use of altering the temperature of an animal in a vivarium for husbandry or study purposes is well established. See, for example, Temperature Regulation in Laboratory Rodents, by Christopher J. Gordon, Cambridge University Press, 1993. In particular, refer to chapter 4, "Thermoregulatory effector responses." Although many animals will seek a warmer or cooler location as a means of regulating their body temperature, many rodents, mice in particular, alter their behavior as a way to regulate their body temperature. As Mr. Gordon says, (ibid, p. 99), "The behavior sensing of temperature is exquisitely sensitive, and behavior effectors for modulation of the ambient thermal environment can be shown to operate continuously." Therefore, using heat as a reward for desired behavior, either natural behavior or learned behavior, is an effective way of both changing and measuring animal behavior. Animal behavior is one crucial aspect of many animal studies.

The warmth or body temperature of an animal is typically either the skin temperature or the internal body temperature. There are various ways to measure these temperatures, both directly and indirectly. Body temperature can often be computed from known models using environmental measurements and can also be estimated by observing behavior.

Prior art typically altered the temperature of an animal by changing the temperature of its environment. This was typically done by altering the air temperature, either by controlling the ambient temperature of the vivarium, by heating the cage, or by providing controlled temperature air into the cage. Gordon refers to all of these as, "the ambient thermal environment." An alternative method was to provide conducted heat such as a warmed cage floor, nesting area, or heating pad.

A weakness of prior art methods was that the cage temperature was kept cooler than the animals preferred living temperature, except when providing the heat reward. This is considered inhumane animal conditions.

Yet another weakness of prior art methods is to move the animals from their primary cage to an experimental cage that is equipped to provide the heat reward. Many animals require an acclimatization period after being transferred to another cage, often measured in days, during which any data collected represents unnatural behavior and thus of little scientific value. Results are further skewed by pheromones and other contaminants of the reused destination cage. The experimental cage may require light for a human experimenter or automated system to detect the behavior to be rewarded. Both the movement and light may be undesirable by the animal and may impact the study results.

Yet another weakness of these prior art methods of providing warmth to an animal is that generally all animals in the cage are heated equally, and thus rewarded equally. Although a cage might be heated non-uniformly, no method of reliably heating only a single, selected animal in a cage of multiple animals exists in the prior art. Therefore, it has not previously been possible to reward specific behavior that required multiple cohabitating animals. Examples include social behaviors such as grooming, mating, sharing, leading, teaching, parenting and fighting.

BRIEF DESCRIPTION OF THE INVENTION

Embodiments of this invention include identifying a specific animal in a cage of multiple animals, identifying a desired behavior that animal, identifying a location of that animal, and then warming only that animal by directing heating radiation, such as by infrared (IR) LEDs or incandescent bulbs. The heat may be directed toward the animal's location, or located where the animal will seek out its heat reward. Some embodiments assure that the heat reward is provided only to the desired animal.

Some provide the heat reward in the animal's primary cage.

Some embodiments maintain the cage temperature within the animal's desired living temperature.

Some embodiments maintain the lighting of the cage in a range within the desired lighting conditions of the animals. For example, by keeping the animal in the dark with respect to its own visible spectrum of light.

DETAILED DESCRIPTION OF THE INVENTION

Figure 1:
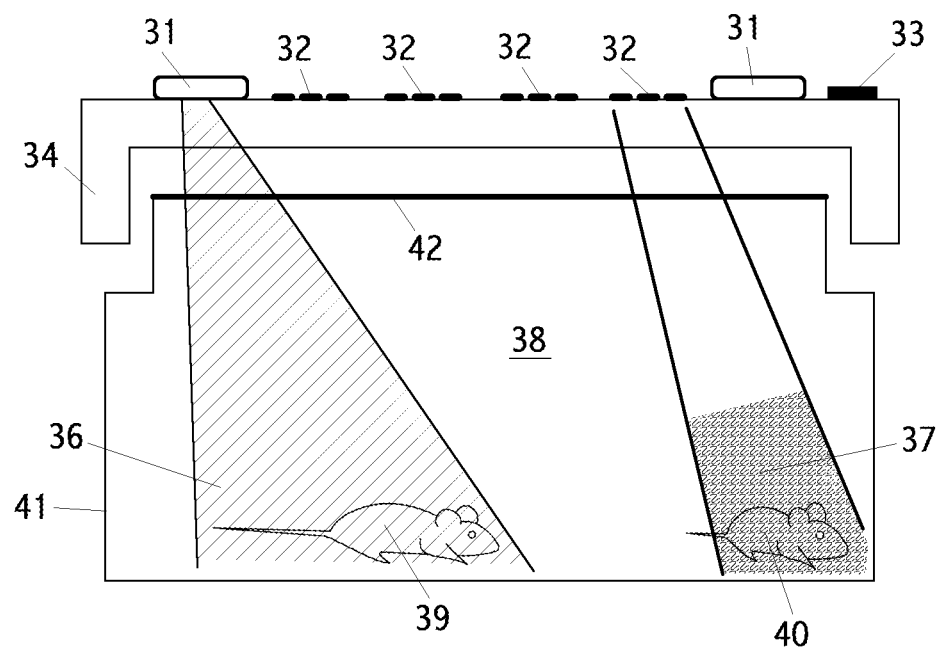
FIG. 1 shows a schematic side view of a cage with sensors and directed heat sources.

It is desirable to keep the animals in a vivarium in sterile cages. It is also desirable for sterility and for practical reasons such as cost, maintainability, and keeping foreign material out of the cage, to use a cage with no electrical penetrations.

Therefore, it is also desirable to implement sensors and heating methods that are free of electrical penetrations of the cage.

Rodents are prone to chew on almost every material in their cage. Thus, keeping sensors and electronics outside the cage is particularly important.

Various methods of identifying an animal are used in different embodiments. One method comprises short-distance RFID, which may use animal ear RFID tags and RFID sensors outside the cage. Another method comprises using video for identification, which may use animal size, coloration, unique natural or artificial body elements, such as body modifications or affixed tags, for example, to provide or to assist in the identification. Another method comprises use of an animal scale: animals of distinct weights may be identified when that animal is on the scale.

Another method of identifying an animal is to combine technologies. For example, an animal may be first identified using an RFID when the animal is within a small RFID range, then tracking the movement of that animal using video and tracking software. Yet another method is by exclusion: if all of the other animals in a cage are identified, then the one remaining animal is also identified.

Yet another method to identify animals is by the sounds they make.

Yet another method to identify animals is by the use of visible code placed on the animal, such as a tattooed bar code on the tail.

Yet another method to identify animals is by observing behavior unique to that animal.

Various methods are used in various embodiments to detect the location of an animal in a cage. One method uses short-range RFID. For example, RFID sensors may be placed at one or more locations around the perimeter of a cage, such as at the corners, of the center of the sides, and the like. When an animal comes within range of a sensor its location is then known.

Another method of detecting the location of an animal is by activity on a device, such as an exercise wheel, or on a scale.

Yet another method of detecting the location of an animal the use of an animal sensor outside of the cage, with a directional range or a short range. Examples of such detectors include thermal detectors, capacitive sensors, and motion sensors.

Yet another method of detecting the location of an animal is to use a video signal and video image processing.

In some embodiments, the identification and location of an animal may be combined using the same sensor or technology, or by using overlapping elements of sensors. For example, a single RFID sensor may be used to both identify an animal and know that it is within range of the sensor. As another example, a single video signal from a single camera may go to two separate image processing elements, one for animal identification and one for animal location.

In some embodiments, real-time animal tracking within the cage may be used as part of both identification and location. For example, if an animal has a known ID and a known location, by tracking the location of the animal within the cage the ID remains known and the location is updated by the tracking algorithm.

Rodents have a preferred ambient temperature. When they have an ability to select or alter the ambient temperature of their environment, for example by choosing a location within a temperature gradient, or by operating a lever to increase or decrease temperature, they select a temperature within a range called Ta. Ta for different rodents has been extensively studied. See, for example, Gordon at p. 103. *The NIH Guide-for-the-Care-and-Use-of-Laboratory-Animals*, National Academic Press, Washington D.C., 2011, ("NIH Guide") refers to a thermoneutral zone (TNZ), bounded by the lower and upper critical temperatures where the animals do not need to adjust their body temperature by physiological or behavioral changes, p. 43. "For example, for mice the TNZ of mice ranges between 26° C. and 34° C." Ibid, p. 43. The NIH Guide recommends that cage temperatures for mice be in the range of 20° to 26° C., Table 3.1. The recommended temperature range is below the animals' TNZ in order to avoid heat stress. Adequate bedding and shelter should be provided to avoid cold stress.

In one embodiment, cage temperature may be raised and controlled within the TNZ, but not below, so that radiant heat for rewards may be used without the risk of heat stress, and also so the animal does not resort to hiding in bedding and shelter to avoid cold stress. This is a notable improvement over prior art and distinct from prior teachings and industry standards.

A "normal living temperature" for animals may be a range of temperatures surrounding Ta, such as within ±5°, within ±3°, within ±2°, or within ±1°, or another effective range for a husbandry or study need. Ta may not be centered within with the "normal living temperature" range.

Embodiments of this invention reward an identified animal for identified behavior with warmth.

Embodiments of this invention provide the warmth reward free of a conducted heat source, from either within the cage or from external to the cage.

Embodiments of this invention provide the warmth reward free of directly or significantly altering the ambient air temperature of the cage. Here, "significant" means either altering or putting at risk the validity of study results, or changing an animal's physiological or temperature adapting behavior.

Embodiments of this invention use a set of infrared (IR) LEDs located external to the cage, wherein various LEDs in the set are directed at various locations within the cage. By directed, we mean the radiation from the LED is so directed. The LEDs are turned on selectively so that animals at the directed locations are warmed by the radiant heat from the LEDs, rather than conducted heat from the ambient air temperature, or from cage, or from bedding, or from in-cage device temperatures.

Embodiments of this invention use a set of directed heat sources located external to the cage, wherein various directed heat sources in the set are directed at various locations within the cage. By directed, we mean the radiation from the directed heat sources is so directed. The directed heat sources are turned on selectively so that animals at the directed locations are warmed by the radiant heat from the directed heat sources, rather than conducted heat from the ambient air temperature, or from cage, or from bedding, or from in-cage device temperatures.

When we say that an animal is warmed from the radiant heat from the directed heat sources, rather than from conducted heat, we mean that the radiant heat from the directed heat sources provides at least 30%, 50%, 70%, 80%, 90%, 95%, 98% or 100% of the effective heat to increase, as a reward, either the skin temperature or the internal body temperature of an animal.

In one embodiment, the directed heat sources may provide heat to all of the animals in a cage, except of one or more selected animals. If, for example, if the ambient temperature is below the normal or preferred ambient temperature for the animals in the cage, then the directed heat sources may provide the additional heat desired by the animals so that their skin or internal body temperature is within desired temperature range. By not turning on directed heat sources directed to the location of a selected animal, that animal may be punished, rather than rewarded, by effectively chilling that animal, compared to the other animals in the cage.

In another embodiment, the directed heat sources may provide heat to all of the animals in a cage, except of one or more selected animals, while the ambient temperature is at or above a normal living temperature. If, for example, the ambient temperature is above the normal or preferred ambient temperature for the animals in the cage, then the directed heat sources may provide additional heat to the animals so that their skin or internal body temperature is above their desired temperature. By not turning on directed heat sources directed to the location of a selected animal, that animal may be rewarded, relative to the other animals, by providing it with a normal or preferred body temperature.

A goal of some embodiments is to reward one or more animals in the cage selectively. Note that in some cases it may be desirable to reward all of the animals in the cage.

Unnatural light may affect the behavior of animals in a vivarium, altering the results of a study. Unnatural light includes light on a non-natural schedule. However, if is often desirable to reward behavior that occurs in the dark. Therefore, some embodiments use IR cameras for determining animal ID, animal location, animal behavior, or a combination.

Sterility or pathogen free is important in vivariums to assure the health of the animals and the health of the workers. Also, sterility is critical for accurate, consistent, credible and repeatable study results. Sterility refers to the sufficient restriction of pathogens so as to not so affect the outcome of the study or health or behavior of animals or people. Sterility also refers to husbandry attributes, supplies and usage, as well as health.

Turning now to FIG. 1, we see a schematic side view of a cage. The cage wall is shown, 41. The interior of the cage is shown, 38. 42 shows a top of the cage that provides both a sanitary seal with the rest of the cage, and is also transparent to the IR light used both for video imaging and the IR radiation used to reward an animal with warmth, if that IR radiation source is above the cage, for example, in electronics slab 34. 34 shows an electronics module, here shown above the cage top, 42; however, electronics for embodiments may alternatively be located to the sides of the cage. 31 shows two video cameras, which may use either IR or visible light. 36 shows an exemplary view of one video camera. 32 shows four sets of directed heat sources. The sets of directed heat sources, or individual directed heat sources, each provide directed radiation to a portion of the cage. Here, one set of directed heat sources is shown radiating a portion of the cage, 37. 33 shows a controller. Such a controller may comprise a processor, working memory, program memory, non-transitory memory, sensor interfaces, communications interfaces, and power management, in any combination. Control of the elements of this invention may be local or remote. FIG. 1 shows one mouse, 39, whose identity and location have been determined, at least in part, by a camera, 31. Also shown is a second mouse, 40, being warmed by the radiation from directed heat source 32. The shapes and locations of elements in FIG. 1 is schematic only. Actual shapes, sizes and locations may vary considerable from the Figure.

A directed heat source may comprise one or more IR LEDs, or one or more visible light LEDs, or one or more incandescent bulbs, or another type of heat source. They may be arranged in an array, such as a three by six array above the cage, or in an arrangement considerably different, including at one or more sides of the cage. As few as one heat source may be used on one embodiment; as few as two heat sources may be used in another embodiment. Incandescent bulbs may be run at less than their normal rated voltage to reduce the peak, average, or primary frequency of emissivity.

A directed heat source is a source of radiation adapted to increase the body temperature (skin temperature or internal temperature) of an animal to which the heat source is directed. Directed means that the radiation is non-uniform with respect to a spherical distribution pattern. Suitable frequencies range from very long wave IR to microwave. Suitable frequencies comprise 750, 840, 950 nm, as well as longer wavelengths up to 1.5 mm. Visible or UV light, or both, may also be used. Spectral sources may comprise or more narrow bands, or may be wideband. Sources may comprise black-body radiation, or a portion of a black-body spectrum. A source may be filtered to remove light visible to a human or study animal. A source may be filtered to remove light in a band, such as an IR band, in which a video camera is sensitive. Sources may have a direction due to the inherent nature of the source, or by the use of one or more lenses, or by the use of one or more reflectors, which may or may not be parabolic, or by the use of one or more refractors. One or more Fresnel lenses may be used. Sources may comprise LEDs, IR LEDs, lasers, incandescent bulbs, electrically heated elements such as ceramics, or another radiant heat source. A directed heat source may be time-modulated, pulsed, pulse-width modulated, or otherwise modulated. Modulation may be synchronous with a camera to either include or exclude light from the source during exposure time. "Directed" may also mean brought to bear on a spatial subset of the cage by virtue of placement proximity of the source to an appropriate area of the cage, rather than by focusing, reflecting, refracting or restricting the radiation of the source into a beam.

Optional filters, lenses, reflectors and refractors, for either the video cameras or directed heat sources, are not shown in FIG. 1.

Figure 2:
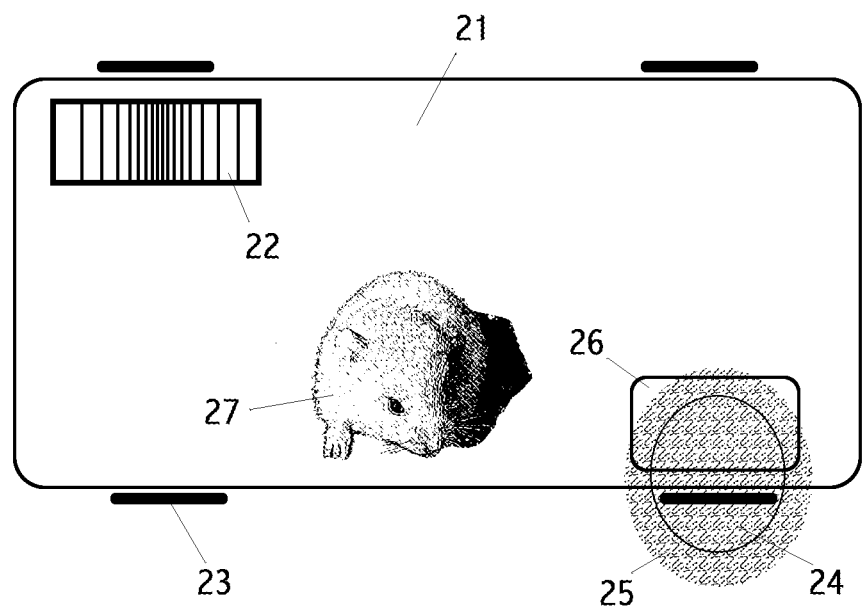
FIG. 2 shows a schematic top view of a cage with RFID sensors, a scale and exercise wheel.

Turning now to FIG. 2, we see a schematic top view of a cage, 21. Also shown are four RFID sensors, external to the cage, 23. The field of detection of one RFID sensor is shown as ellipse 24, or an alternative detection area as shaded area 25. 26 is a representative device in the cage, such as a scale. 22 shows another device in the cage, such as an exercise wheel. A representative mouse is shown, 27. The shapes and locations of elements in FIG. 2 are schematic only. Actual shapes, sizes and locations may vary considerable from the Figure.

Figure 3:
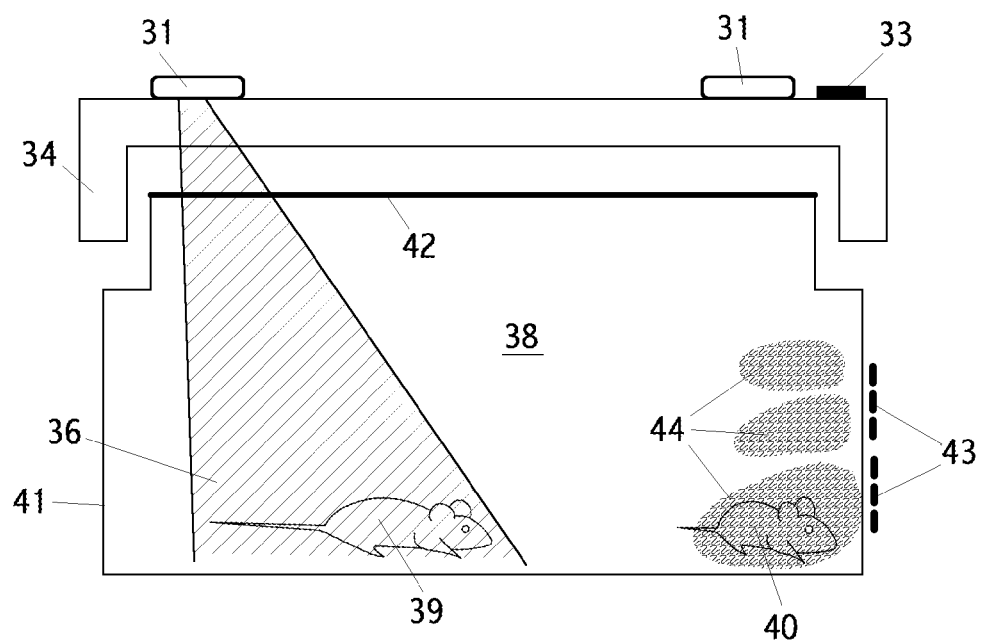
FIG. 3 shows a schematic side view of a cage with RFID sensors and a radiant heat source.

Turning now to FIG. 3, we see another embodiment of a heat source. Numbered elements with the same reference designators as in FIG. 1 are the same elements. Now, the heat source, 43, is on one side of the cage, 41. The cage wall is transparent to the frequency of the radiation of the heat source, 43. The cage wall may be partially or fully opaque to visible light spectra for either the animal or humans. The heat source, 43, provides one or more heated areas, by radiant heat, free of conducted heat, 44. The mouse, 40, is heated radiantly, and may seek out one of the areas, 44, to achieve its heat reward.

The radiant heat source may be spectrally filtered so as to not interfere with optics, such as IR cameras, or communications, such as IR communications. One such filter is a pass filter that passes wavelengths equal to and longer than 940 or 950 nm, while blocking shorter wavelengths, such as 850 nm. Another such filter is a pass filter that passes only wavelengths equal to and longer than 1300 or 1500 nm. An alternative method of limiting the spectral emissivity of the heat source, 43 or 42 (FIG. 1), is to use a heat source that limits undesirable bands by not generating them; for example, one or more IR LED with a primary emissivity at 940 or 950 nm.

In one embodiment a spectral filter is used in the optical path of a video camera to block a sufficient portion of radiation from the directed heat sources so that video images from the camera are not compromised. For example, a camera may be sensitive to about 840 nm. A filter may be used the camera optical path that blocks light of wavelengths longer than 840 nm.

In one embodiment a spectral filter is used in the path of directed radiation from the directed heat sources to block a sufficient portion of radiation from the directed heat sources so that video images from the camera are not compromised. For example, a camera may be sensitive to about 840 nm. A filter may be used in directed heat source path that blocks light of wavelengths of 840 nm or shorter.

In yet another embodiment, filters in both the video imaging path and a directed radiation path are used.

In yet another embodiment, one or more directed heat sources are power modulated synchronously with one or more video camera exposure times, so that illumination from the directed heat sources does not interfere with or comprise images from the one or more video cameras.

Unique improvement over the prior art in some embodiments is the use of home cages (or primary cages) for all or most of the study interactions with the animals, as contrasted with moving the animals from home cages to experimental cages.

In yet another embodiment, animals are housed singly. All references, claims, drawings and discussion applicable to multiple animals in a cage also apply to a single animal in a cage, where multiple animals are not essential to the reference.

Examples of animal rewards include:
performing a stereotypical "nose poke;"
touching its nose to a specific spot on the cage wall, e.g. one behind which there is a green LED not a blue one, or behind which there is the led that is different from the other two;
running on the running wheel for predetermined amount of time or device revolutions;
interacting with another animal in a specific way;
mating, grooming, fighting or parenting;
performing a physiological action or behavior related to increasing or decreasing body temperature; or the lack thereof;
sounds: type, frequency or volume; or the lack thereof;
selecting one food or drink source over another;
resisting eating or drinking;
eating or drinking.

In one embodiment, in a claim for turning off or depowering (one or more) radiant heat source after a predetermined time or after a predetermined event, means that the claim includes two embodiments: (i) depowering responsive to both a predetermined time and a predetermined event, and (ii) depowering responsive to only one of a predetermined time and a predetermined event.

Animal rewards may be timely following the desired behavior, or may be delayed. The heat reward may be at the location of the desired behavior, or may be at another location, included a fixed location in the cage. The animal may learn, for example, that the heat reward is always at a fixed location in the cage, and the animal will move to that location in expectation of the reward.

Additional Embodiments

Embodiment 301

A method for rewarding behavior of a first animal in a primary cage comprising the automated steps of:
(a) controlling the ambient air temperature inside the primary cage to below a normal living temperature wherein the normal living temperature is the average living temperature for first animal;
(b) identifying a first behavior of the first animal;
(c) uniquely identifying the first animal with respect to any other animals, at a first location, in the primary cage;
(d) powering a first set of infrared directed heat sources, external to the cage, wherein the radiation from the first set of directed heat sources is directed to a first set of alternate animal locations, wherein the first set of alternate animal locations does not include the first location of the first animal;
(e) tracking in real-time a changed location of the first animal to a second location in the primary cage;
(f) depowering the first set of directed heat sources and powering a second set of directed heat sources, external to the cage, wherein the radiation from the second set of directed heat sources is directed to a second set of alternate animal locations, wherein the second set of alternate animal locations does not include the second location of the first animal; and wherein the first and second set of LEDs are not the same set;
(g) powering a third set of directed heat sources, external to the cage, after a predetermined time following the start of step (d); wherein the third set of directed heat sources is directed to a third set of animal locations, wherein the third set of animal locations includes the location of the first animal.

Embodiment 302

The method of embodiment 301 wherein:
(h) the ambient air temperature of the primary cage is maintained below the normal living temperature for the first animal during steps (d), (e) and (f);

Embodiment 303

The method of embodiment 301 comprising the additional steps of:
(i) detecting a second behavior of the first animal;
(j) depowering both the first set and second set of directed heat sources responsive to the detecting a second behavior;
wherein steps (i) and (j) are performed between steps (f) and (g).

Embodiment 304

The method of embodiment 301 wherein:
step (d) is performed responsive to the first behavior identified in step (b).

Embodiment 305

The method of embodiment 301 wherein:
the primary cage is free of electrical penetrations.

Embodiment 306

The method of embodiment 301 wherein:
the primary cage is free of a source of conducted heat.

Embodiments of this invention explicitly include all combinations and sub-combinations of all features, elements and limitation of all claims. Embodiments of this invention explicitly include all combinations and sub-combinations of all features, elements, examples, embodiments, tables, values, ranges, and drawings in the specification and drawings. Embodiments of this invention explicitly include devices and systems to implement any combination of all methods described in the claims, specification and drawings.

DEFINITIONS

Communication—may be electromagnetic, optical or audio. Audio comprises sub-audio and ultrasonic audio.

Directed heat sources—see text above.

Electromagnetic radiation—may be visible or IR light, for example, imaged by a still or video camera. May be digital or analog radio signals, such as used by RFID, Bluetooth, WiFi, or other standard or proprietary communications. May be analog or digital optical communications.

IR LED—any LED that is capable without limitation, by its radiation, of causing an animal within its directed radiation to increase in body temperature, that is, skin temperature or internal temperature, by an amount detectable by the animal, as observable. Note that the spectrum of the IR LED may or may not be predominantly in the infrared with respect to the visible spectrum.

Normal living temperature—a temperature range suitable for an animal to live normally or a temperature range appropriate for specific animal study. This may be Ta plus or minus a predetermined range, or an industry accepted range for use of the applicable laboratory animals in the applicable study.

Pathogen-free—means the population of microbes, including but not limited to bacteria, viruses, prions and toxins, relevant to the experiment, are sufficiently reduced to meet the needs of the study, or to not impact the health, performance or behavior of the target animal population or of the workers.

Primary cage—the cage in which an animal spends more time than any other cage. Of note, there is a related term of art: "home cage." The definition of primary cage is, in some embodiments, the home cage. An aspect of home cage/primary cage deals with the fungibility of the actual cage itself. Each time a cage is changed, the physical cage is generally either disposed or removed for washing, and replaced by a clean cage. The new physical cage is considered the same primary cage. A primary cage may sometimes be distinguished from a non-primary cage by the purpose of the cage. For example, a home cage may be for living in, as compared to an experimental cage to which the animal is transferred that is equipped or located for one or more particular experiments for the applicable study.

The primary cage is different from special purpose, behavioral-measurement, behavioral-detection, or behavioral-observation cages that are generally used for only a short time for the duration of a particular test due to cost and mindset.

Sealed enclosure—an enclosure sealed against pathogens that impact or alter study results, or alter the credibility or repeatability of study results, entering or leaving the enclosure.

Sensor—may or may not include the use of local or remote processors, and may or may not include local or remote software executing on the local or remote processors. Sensors may or may not communicate over a network. Multiple sensors may or may not include common elements.

Set—one or more, unless stated otherwise.

Sterile—pathogen-free.

Visible light—Free of visible light mans the ambient light is sufficiently low and in a spectrum such that the animal's physiological state and behavior are consistent with its natural physiological state and behavior at night.

Ideal, Ideally, Optimum and Preferred—Use of the words, "ideal," "ideally," "optimum," "optimum," "should" and "preferred," when used in the context of describing this invention, refer specifically a best mode for one or more embodiments for one or more applications of this invention. Such best modes are non-limiting, and may not be the best mode for all embodiments, applications, or implementation technologies, as one trained in the art will appreciate.

May, Could, Option, Mode, Alternative and Feature—Use of the words, "may," "could," "can," "option," "optional," "mode," "alternative," "typical," "ideal," and "feature," when used in the context of describing this invention, refer specifically to various embodiments of this invention. Described benefits refer only to those embodiments that provide that benefit. All descriptions herein are non-limiting, as one trained in the art appreciates.

What is claimed is:

1. A method for rewarding behavior of a first animal in a primary cage comprising the automated steps of:

(a) controlling the ambient air temperature inside the primary cage to within a normal living temperature wherein the normal living temperature is the average living temperature for first animal;

(b) identifying a first behavior of the first animal;

(c) uniquely identifying the first animal with respect to any other animals, at a first location, in the primary cage;

(d) powering a first set of directed heat sources external to the cage, wherein the radiation from the first set of directed heat sources is directed to the first location in the primary cage such that the radiation from the first set of directed heat sources is not directed to the location of any other animals in the primary cage;

(e) tracking in real-time a changed location of the first animal to a second location in the primary cage;

(f) depowering the first set of directed heat sources and powering a second set of directed heat sources, external to the cage, wherein the radiation from the second set of directed heat sources is directed to the second location in the primary cage, and wherein the first and second set of directed heat sources are not the same set;

(g) depowering both the first set and second set of directed heat sources after a predetermined time following the start of step (d).

2. The method of claim 1 wherein:

(h) the ambient air temperature of the primary cage is maintained within the normal living temperature for the first animal during steps (d), (e) and (f).

3. The method of claim 1 comprising the additional steps of:

(i) detecting a second behavior of the first animal;

(j) depowering both the first set and second set of directed heat sources responsive to the detecting a second behavior;

wherein steps (i) and (j) are performed between steps (f) and (g).

4. The method of claim 1 wherein:

step (d) is performed responsive to the first behavior identified in step (b).

5. The method of claim 1 wherein:

the primary cage is free of electrical penetrations.

6. The method of claim 1 wherein:

the primary cage is free of a source of conducted heat.

7. The method of claim 1 wherein:

step (e) is performed, at least in part, by an infrared (IR) sensitive video camera and wherein at least some of the IR light used to illuminate the cage interior for use by the IR sensitive video camera is provided by at least some of the directed heat sources in the first or second set of directed heat sources.

8. The method of claim 7 wherein:
step (e) is performed, at least in part, by powering the first or second set of directed heat sources with less power than used for steps (d) and (f).

9. The method of claim 1 wherein:
the first animal is not rewarded using conducted heat.

10. The method of claim 1 wherein:
the first animal is a rodent.

11. The method of claim 1 wherein:
the first animal is not removed from its primary cage for repetitive executions of the method during a time interval of one month.

12. An automated system implementing the method of claim 1.

13. A device for the purpose of automatically rewarding a predetermined behavior of an animal comprising:
an animal cage, wherein the animal cage is the primary cage for the animal, wherein the animal cage is free of electrical penetrations; and wherein the temperature in the cage for the animal is maintained within or below the thermoneutral zone for the animal;
a first animal behavior sensor, located outside the animal cage, responsive to electromagnetic radiation or an audio transmission, transmitted through the cage, configured to identify the predetermined animal behavior of an animal in the animal cage;
a set of radiant heat sources wherein the radiation of the set is directed into a first portion of the cage such that a second portion of the cage receives no radiation from the set;
a controller configured to power and depower the set of directed heat sources responsive to the animal behavior sensor,
wherein the device is free of a source of conducted heat for rewarding the animal.

14. The device of claim 13 wherein:
the temperature in the cage for the animal is maintained within the thermoneutral zone for the animal.

15. A device for the purpose of automatically rewarding a first predetermined behavior of an animal comprising:
an animal cage, wherein the animal cage is the primary cage for the animal, wherein the animal cage is free of electrical penetrations;
an animal identification (ID) sensor, located outside the animal cage, responsive to electromagnetic radiation or an audio transmission, transmitted through the cage, configured to uniquely identify the animal in the animal cage with respect to other animals in the animal cage;
a first animal behavior sensor, located outside the animal cage, responsive to electromagnetic radiation or an audio transmission, transmitted through the cage, configured to identify the first predetermined animal behavior of an animal in the animal cage;
a first animal location sensor located outside the animal cage, responsive to electromagnetic radiation or an audio transmission, transmitted through the cage, configured to identify a first location of an animal in the animal cage;
a second animal location sensor located outside the animal cage, responsive to electromagnetic radiation or an audio transmission, transmitted through the cage, configured to identify a second location distinct from the first location, of an animal in the animal cage;
a first set of directed heat sources wherein the radiation of the first set is directed to the first location;
a second set of directed heat sources wherein the radiation of the second set is directed to the second location, and wherein the first and second sets are not the same;
a controller configured to power and depower the first and second set of directed heat sources responsive to the animal ID sensor, the first animal behavior sensor, the first animal location sensor and the second animal location sensor; and
wherein the device is free of a source of conducted heat for rewarding the animal.

16. The device of claim 15 wherein:
the controller is further configured to power and depower the first and second set of directed heat sources responsive to the animal ID sensor identifying a first animal, the first animal behavior sensor identifying the first animal behavior of the first animal, the first animal location sensor identifying the first animal at the first location, and the second animal location sensor identifying the first animal at the second location.

17. The device of claim 15 further comprising:
a second animal behavior sensor, located outside the animal cage, responsive to electromagnetic radiation or an audio transmission, transmitted through the cage, configured to identify a predetermined second animal behavior, distinct from the first animal behavior, of an animal in the animal cage; and
the controller is further configured to power and depower the first and second set of directed heat sources responsive to the animal ID sensor identifying a first animal, the first animal behavior sensor identifying the first animal behavior of the first animal, the second animal behavior sensor identifying the second animal behavior of the first animal, the first animal location sensor identifying the first animal at the first location, and the second animal location sensor identifying the first animal at the second location.

18. The device of claim 15 wherein:
the animal cage is free of visible light.

19. The device of claim 15 wherein:
the controller is further configured to perform its responsive powering and depowering when the animal cage contains at least two animals.

20. The device of claim 15 wherein:
the controller is further configured to perform its responsive powering and depowering when the animal cage contains at least three animals.

* * * * *